June 2, 1959  W. BODE  2,888,780
RESHAPING HOT GLASS BY HIGH PRESSURE AIR JETS
Filed Aug. 24, 1956  3 Sheets-Sheet 1

Inventor
WOLFE BODE
By Rule and Hoge Attorneys

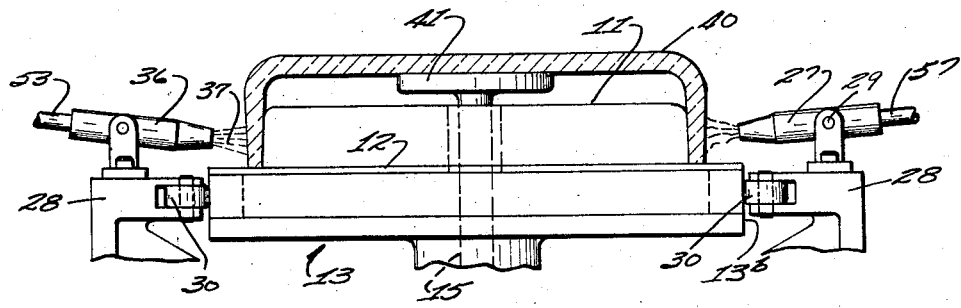

United States Patent Office 2,888,780
Patented June 2, 1959

2,888,780

RESHAPING HOT GLASS BY HIGH PRESSURE AIR JETS

Wolfe Bode, Toledo, Ohio, assignor to Owens-Illinois Glass Company, a corporation of Ohio Application August 24, 1956, Serial No. 606,151

7 Claims. (Cl. 49—7)

My invention relates to a means for reshaping or reforming hollow glass articles or other ware while in a soft or plastic condition. The invention may be used for reforming edge portions of the articles and in the form herein illustrated and described in detail is used for reforming the sealing edges of funnels and face plates which thereafter are sealed together for forming picture tubes. In such molded parts of picture tubes formed of glass, there is more or less distortion or irregularity in the molded parts. In order to form a perfect seal between the funnels and face plates it is necessary to reshape the sealing edges. This is usually done with a mechanical roller or paddle by which the parts are marvered or reshaped. The use of such tools causes checking or lap marks, roller brake pattern, and other marks or defects during the reforming operation.

An object of the present invention is to provide a means by which the reforming operation may be performed without the use of such tools and without any mechanical contact of a shaping tool with the glass, thereby preventing such marks or defects. In the attainment of this object the invention provides a means for blowing high velocity jets of air or other gas against the softened glass and thereby shaping it to a desired contour which is determined by the shape of a block or tool forming a backing at the inner surface of the part to be reformed.

Other objects of the invention will appear hereinafter.

In practicing the invention with apparatus as herein illustrated, a funnel body or other workpiece which is to have its sealing edge reformed is placed over a shaping block with the rim surface of the block in contact with the inner rim surface of the workpiece. The block and workpiece are then rotated about a vertical axis while a burner flame or flames are directed against the exterior surface of the rim for softening the glass. When the glass is in a softened condition a high velocity jet or jets of air or other gas are directed against the said outer rim surface, thereby reshaping the rim to conform to the shape of the opposite surface of the shaping block.

The workpiece is preferably preheated to a temperature of 600 to 750° F. before placing it on the reshaping apparatus. The burner jet or jets are then applied to the rim of the rotating workpiece to further raise the temperature and soften the glass. When this temperature, from 1200 to 1400° F. is reached, the air blast is turned on and thereby reshapes the rim of the article, the flame jets and air jet or jets operating concurrently. When the reshaping operation is completed and the air blast is turned off the burner flames are continued for a short time, a few seconds, for annealing the reshaped glass. The invention provides an automatic control system for controlling application of the heating and air pressure jets in the proper order and timed relation during the heating and reshaping operations.

Referring to the accompanying drawings which illustrate an apparatus for reshaping funnel bodies and face plates of picture tubes, and other glass articles:

Fig. 5 is a part sectional elevation, with parts broken away, of the apparatus as adapted for reshaping the rim of the face plate;

Fig. 6 is a diagrammatic view of the electrical and mechanical control system; and Fig. 7 is a cross section at the line 7—7 on Fig. 6.

Figure 1:
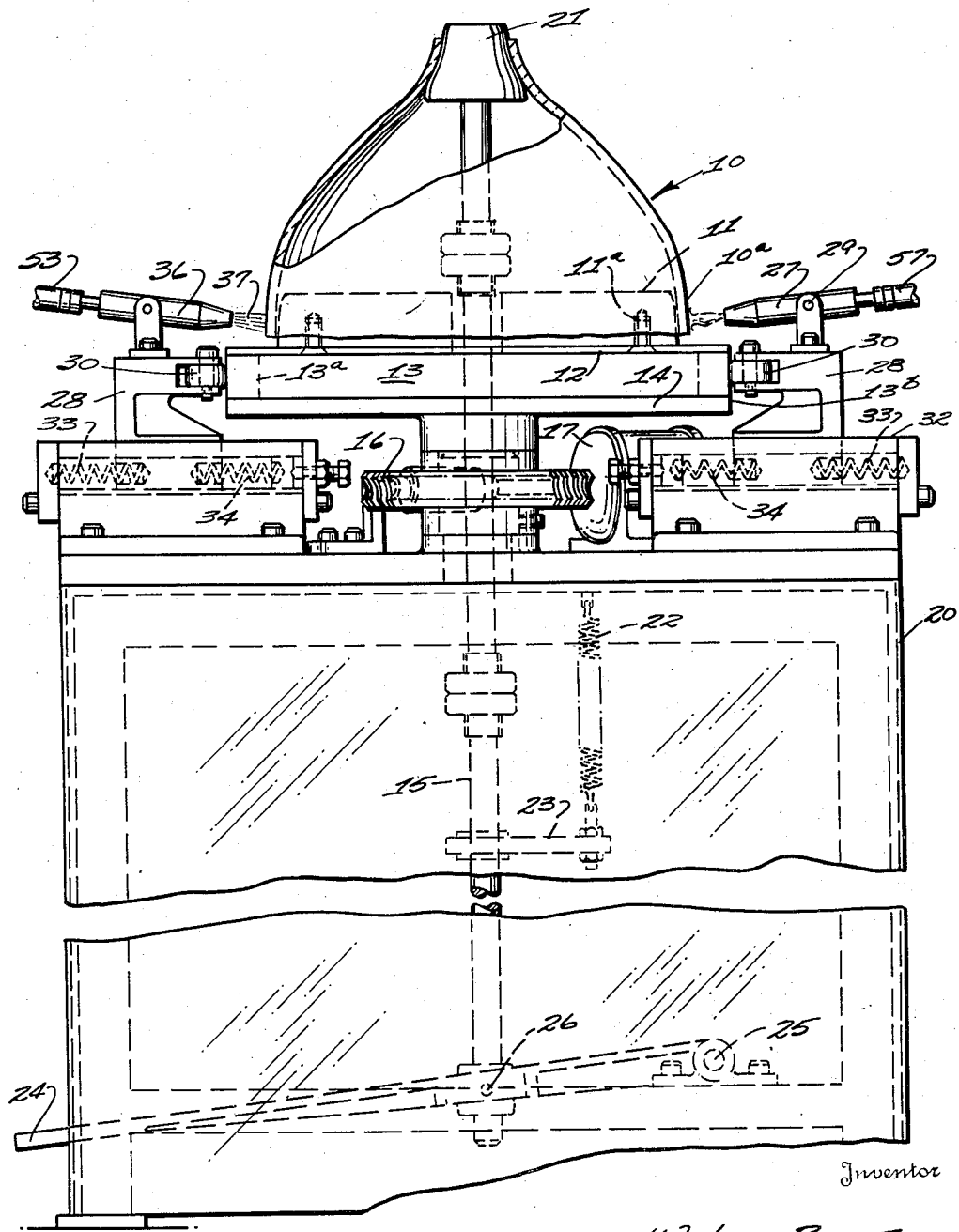
Fig. 1 is an elevational view of the apparatus with parts omitted.
Figure 2:
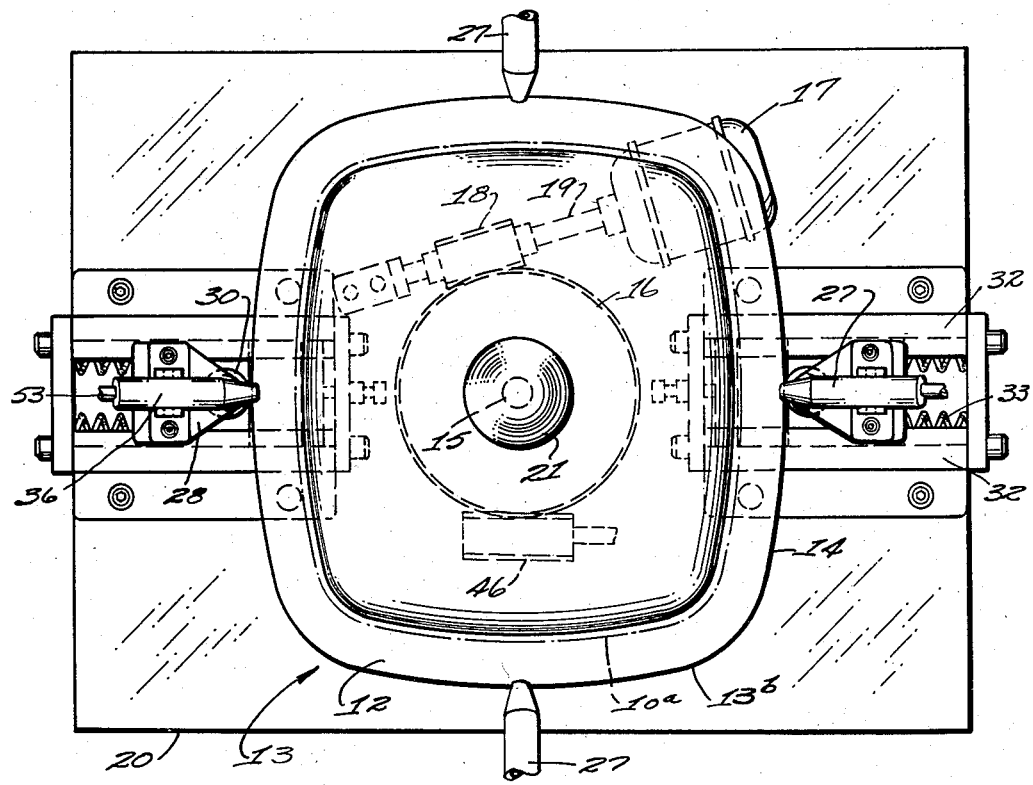
Fig. 2 is a plan view of the apparatus.
Figures 3, 4:
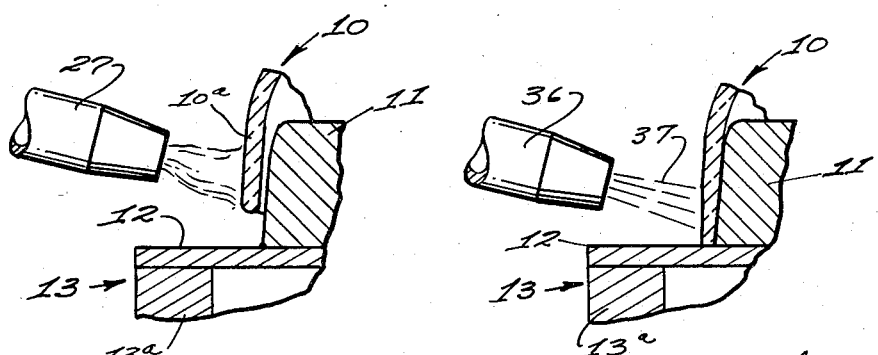
Fig. 3 is a fragmentary sectional view showing the application of a heating flame to the rim of the workpiece.
Fig. 4 is a similar view showing an air pressure nozzle operating to reshape the rim.

Referring to the drawings, Figs. 1 and 2 illustrate the apparatus as designed and adapted for reshaping the rim portion 10$^a$ of an article 10 here shown as a picture tube body or funnel. The workpiece 10 during the reshaping operation rests on a horizontal plate 12 which is a part of a cam or cam assembly 13 comprising upper and lower plates 12 and 14 and an intermediate spacing element 13$^a$ extending along the margins of the plates 12 and 14. The outer marginal surfaces of the parts 12, 13$^a$, and 14 are coextensive laterally and provide a vertical cam surface 13$^b$ extending throughout the periphery of the cam. A shaping tool in the form of a block 11 is mounted on the plate 12 and held in fixed position thereon by screws 11$^a$. The rim surface of the block 11 conforms to the shape of the inner surface of the rim 10$^a$ and provides a backing for said surface during the reshaping operation.

The cam surface 13$^b$ as viewed in plan (Fig. 2) is spaced outwardly from the rim surface of the workpiece and is substantially parallel therewith. The cam 13 is mounted for rotation about the axis of a vertical shaft 15. A worm gear 16 mounted for rotation about said axis and having a fixed connection with the cam, is rotated by an electric motor 17. A worm 18 on the motor shaft 19 runs in mesh with the worm gear 16.

The apparatus as shown is mounted on a supporting frame or cabinet 20. The shaft 15 extends downwardly within the cabinet 20 and is mounted for up-and-down movement. A head 21 attached to the shaft 15 at the upper end thereof provides a support for the workpiece 10. The shaft 15 is normally held in its lifted position by a coil spring 22 attached at its upper end to the frame 20 and at its lower end to an arm 23 fixed to the shaft 15. The spring 22 is under tension and holds the shaft 15 in its upper position while the machine is at rest. A foot pedal 24, fulcrumed on a pivot pin 25, is connected by a pin 26 to the lower end portion of the shaft 15.

The workpiece 10 is placed on the head 21 while the shaft is in its lifted position. The operator then depresses the pedal 24, thus lowering the shaft and seating the workpiece on the cam plate 12. The motor 17 is then started as presently described for rotating the cam and the workpiece thereon. During this rotation the rim 10$^a$ is heated by jets or burners 27 which are mounted and arranged to direct heating flames against the outer surface of the rim 10$^a$. Preferably a plurality of such burners are employed and operate simultaneously or concurrently. As shown in Fig. 2 three burners are used, spaced at intervals circumferentially of the path of the workpiece. Each burner is mounted on a carrier in the form of a block 28, the burner being connected to swing about a horizontal pivot 29. The block 28 carries a cam follower roll 30 which runs on the cam surface 13$^b$. The carrier 28 is mounted in a pair of guide rails 32 for reciprocating movement toward and from the center shaft 15. Coil compression springs 33 between the guide rails 32 hold the cam follower roll 30 on the cam. Coil springs 34 also under compression partly counterbalance the force of the springs 33. The carriers thus have a floating mounting.

One or more high pressure jet blowers 36 are mounted and arranged to apply jets 37 of air or other gas under high pressure against the rim 10ª after the latter has been softened by the operation of the burners 27. The blower 36 may be substantially similar in construction to the burners 27 and is also mounted on one of the carriers 28. The air blast is supplied under pressure which is preferably within the range of 50 to 100 pounds per square inch. The orifice of the blower nozzle is spaced only a short distance from the rim 10ª which is being reshaped, for example, 1 inch or 1½ inches. This distance for both the burners and the blower is maintained substantially constant by the cam.

Fig. 5 illustrates a construction adapted for heating and shaping the rim surface of a face plate 40 which later may be welded to the reformed funnel 10. A supporting plate or disk 41 is attached to the upper end of the shaft 15 and functions in the same manner as the supporting head 21.

Referring to Fig. 6, which illustrates diagrammatically the control system for the driving motor 17 and the burners and blowers, a timer shaft 45 is operatively connected to be driven by the motor 17. Driving connections between the motor and the timer shaft include a worm 46 running in mesh with the worm gear 16. The worm shaft carries a sprocket gear 48 having driving connection through chain 49 with a gear 50 keyed to the timer shaft 45. A timer cam 51 on the shaft 45 operates a valve 52 in the air pressure line 53. A timer cam 55 on the timer shaft operates a valve 56 in the fuel line 57 through which the fuel gases are supplied to the burners 27, all of the burners being connected to receive fuel gas through the line 57. A timer cam 60 on the timer shaft 45 operates a switch 61 in the control circuit of the motor 17. When the switch 61 is closed the motor control circuit is established across the mains $a$ and $b$ of a power supply line. The timer shaft 45 is geared to the motor for making one complete rotation during each heating and reforming operation of a workpiece. At the completion of the cycle the cam 60 opens the switch 61 to stop the motor 17. The motor is started manually for each succeeding operation by momentarily depressing a push button 63, thus closing a bypass circuit across the switch 61. As soon as the motor starts, the cam 60 closes the switch 61.

Alternative means for starting the motor 17 includes a switch 65 which is closed momentarily by the foot pedal 24 when the latter is depressed. This switch is also connected in parallel with the switch 61 and thus will operate automatically to start the motor when the foot pedal is depressed. The foot pedal when depressed operates through a trip device 66 to close the switch 65 momentarily. This permits the motor to start so that the cam 60 will close the switch 61 and maintain a circuit for the motor independently of the switch 65 when the latter is again opened during the final downward movement of the pedal. The motor is thus under the control of the timer cam 60 and will stop while the pedal is still in a depressed position. When foot pedal control of the motor circuit is not desired, a switch 67 is left open.

Operation

A resume of the operation is as follows: A workpiece 10 is placed on the supporting head 21 (Fig. 1). The foot pedal 24 is then depressed, thereby lowering the shaft 15 and allowing the workpiece to move down and seat on the cam plate 12. The operator then closes the push button switch 63, thereby starting the motor 17. The motor thus rotates the cam 13 and the workpiece about a vertical axis. Rotation of the workpiece about a vertical axis. Rotation of the workpiece at a speed of 25 r.p.m. is found satisfactory in reforming picture tube bodies and face plates. The timer shaft commences its rotation when the motor starts. The timer cam 55 immediately opens the fuel gas line 57 so that the burners 27 project flames against the rim 13 of the workpiece while the latter rotates.

The workpiece rim may be heated to 600 to 750° F. before placing it on the machine. The burners 27 raise this temperature to a point at which the glass is soft and plastic. By this time the timer cam 51 has rotated into position to open the air pressure line 53 so that a blast of air is directed against the softened glass. This pressure is sufficient to press the softened glass against the shaping block or tool 11. The rotation of the workpiece causes the pressure to advance progressively throughout the entire circumference of the rim so that the latter is reformed to conform to the shape of the forming block. This pressure may be maintained through several complete rotations of the workpiece, permitting the reshaping to etxend through more than one revolution of the workpiece. The timer cam 55 is shaped to cut off the air pressure while the burners 27 are still operating. The heat supplied from the burners after the reshaping operation is completed serves to anneal the glass. The timer cam 55 then cuts off the fuel supply from the burners. As the timer shaft completes its rotation, the cam 60 opens the switch 61 and stops the motor. The foot pedal 24 is then released so that the spring 22 lifts the workpiece, permitting it to be removed, thus completing the cycle.

Modifications may be resorted to within the spirit and scope of my invention.

I claim:

1. Apparatus for reforming the rim of an open hollow article comprising means for mounting the article for rotation about an axis, means for rotating the article about said axis, automatic means operable during said rotation to heat the rim to a temperature at which it is soft and plastic, a blower mounted in position to apply a blast of gas against the outer surface of said rim during said rotation, automatic means for supplying gas under pressure to the blower and applying the blast to said outer surface, and means providing a backing surface extending along the inner surface of the rim, the force of the blast being sufficient to reshape the said rim to conform to said backing surface during said rotation while the said rim is soft and plastic.

2. Apparatus for reshaping the rim of a hollow glass article, said apparatus comprising means for mounting the article for rotation about an axis, means for rotating the article, a forming block mounted for rotation with the article and having a forming surface extending along the inner surface of said rim and forming a backing for said inner surface, means for applying heat to said rim during said rotation and thereby heating it to a temperature at which it is soft and plastic, means for applying pneumatic pressure to the exterior surface of the rim within a restricted area while the rim is soft and plastic, said area being caused to advance progressively along said rim by the rotation of the article, whereby the rim is progressively reformed to conform to the shape of the said backing surface.

3. The apparatus defined in claim 2, the means for applying pneumatic pressure consisting of a blower mounted and positioned to direct a blast of gas against said rim during the rotation of latter.

4. Apparatus for reshaping the rim of an open hollow glass article, said apparatus comprising means for mounting the article for rotation about an axis, a shaping block mounted for rotation with the article and having a shaping surface extending along the inner surface of said rim and forming a backing for said inner surface, a burner mounted and arranged to direct a heating flame against the outer surface of said rim during said rotation, a blower mounted and arranged to direct a blast of gas against said outer surface of the rim during said rotation, an electric motor, transmission means through which the motor is geared to said shaping block for rotating the article and said block as a unit, means providing a fuel gas line through which fuel gas is supplied to the said burner, and means providing a pressure line through which gas is supplied to said blower.

5. Apparatus for reforming the rim of a hollow open glass article, said apparatus comprising means for mounting the article for rotation about a vertical axis, a shaping block mounted for rotation with the article and having a marginal shaping surface forming a backing surface for the inner surface of said rim, said backing surface and rim being non-circular, a burner for applying a heating flame to said rim, a blower for applying an air blast to the outer surface of said rim, carriers for said burner and blower, stationary guiding means in which said carriers are mounted for movement radially toward and from said axis, a stationary cam, cam follower rolls journalled in said carriers and running on said cam, said cam shaped to maintain the burner and blower at a substantially constant distance from the rim of the workpiece throughout the rotation of the latter.

6. Apparatus for reforming the rim of a workpiece consisting of a hollow glass article, said apparatus comprising means for heating the rim to a soft and plastic condition, a horizontal plate forming a support for the workpiece during the reforming operation, a vertical shaft extending above and below said plate, a supporting head on the upper end of said shaft to support the said article, said shaft mounted for up-and-down movement, spring means for holding the shaft in its upper position with the workpiece supported thereon and spaced above said plate, a shaping block mounted on said plate, means comprising a foot pedal connected to the shaft for lowering said shaft and thereby lowering the workpiece on to said plate, said shaping block having its peripheral surface shaped to extend within said article and form a backing for the inner surface of the rim of the workpiece when the latter is lowered on to the said plate, a blower mounted in position to blow a blast of gas against the outer surface of said rim when the workpiece is supported on said plate, a motor, means providing driving connection between the motor and said plate for rotating the plate and shaping block about the axis of said shaft, and means for supplying gas under pressure to said blower when the foot pedal is lowered.

7. The apparatus defined in claim 6, said heating means including a burner mounted to direct a flame against said rim and thereby heating and softening the glass forming said rim.

References Cited in the file of this patent

UNITED STATES PATENTS

| | | |
|---|---|---|
| 1,482,789 | Gmelin | Feb. 5, 1924 |
| 2,106,193 | Sloan | Jan. 25, 1938 |
| 2,152,754 | Wagner | Apr. 4, 1939 |
| 2,427,722 | Greiner | Sept. 23, 1947 |
| 2,494,871 | Greiner | Jan. 17, 1950 |
| 2,580,450 | Melcher et al. | Jan. 1, 1952 |
| 2,611,216 | Snow et al. | Sept. 23, 1952 |

FOREIGN PATENTS

| | | |
|---|---|---|
| 339,503 | Germany | Aug. 9, 1919 |